(12) United States Patent
Dresscher

(10) Patent No.: US 11,764,877 B2
(45) Date of Patent: Sep. 19, 2023

(54) OPTIC SIGNAL RECEIVER, OPTIC COMMUNICATION SYSTEM AND OPTIC COMMUNICATION METHOD

(71) Applicant: Nederlandse Organisatie voor toegepast-natuurwetenschappelijk onderzoek TNO, 's-Gravenhage (NL)

(72) Inventor: Martijn Dresscher, Rijswijk (NL)

(73) Assignee: Nederlandse Organisatie voor toegepast-natuurwetenschappelijk onderzoek TNO, 's-Gravenhage (NL)

(*) Notice: Subject to any disclaimer, the term of this patent is extended or adjusted under 35 U.S.C. 154(b) by 0 days.

(21) Appl. No.: 17/909,166

(22) PCT Filed: Mar. 5, 2021

(86) PCT No.: PCT/NL2021/050153
§ 371 (c)(1),
(2) Date: Sep. 2, 2022

(87) PCT Pub. No.: WO2021/177832
PCT Pub. Date: Sep. 10, 2021

(65) Prior Publication Data
US 2023/0086130 A1  Mar. 23, 2023

(30) Foreign Application Priority Data

Mar. 6, 2020  (EP) ..................... 20161518

(51) Int. Cl.
*H04B 10/00* (2013.01)
*H04B 10/67* (2013.01)
(Continued)

(52) U.S. Cl.
CPC ......... *H04B 10/671* (2013.01); *H04B 10/118* (2013.01)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS

2017/0207850 A1* 7/2017 Takahashi .............. H04B 10/60

FOREIGN PATENT DOCUMENTS

EP  3119019 A1  1/2017

OTHER PUBLICATIONS

European Patent Office, International Search Report in corresponding International Application No. PCT/NL2021/050153, dated Jun. 24, 2021 (2 pages).

* cited by examiner

*Primary Examiner* — Daniel G Dobson
(74) *Attorney, Agent, or Firm* — Leydig, Voit & Mayer, Ltd.

(57) ABSTRACT

An optic signal receiver is provided that comprises an optic signal detection unit an estimation unit, and a feedback control unit to provide a detector control signal. The optic signal detection unit comprises an adaptive optic module, a mode splitting module and a signal detection module, wherein the adaptive optic module is to modify a received optic input signal under control of the detector control signal into a multi-mode optic output signal, the mode splitting module is configured to branch the multi-mode optic output signal off into multiple reduced mode optic signals and the signal detection module is configured to issue a detection signal, the signal detection module comprising a plurality of signal detection sections that are each configured to measure an intensity of a respective one of the reduced mode optic signals and to provide a respective indicator indicative of the measured intensity as a component of the detection signal.

(Continued)

The feedback control unit is configured to minimize a difference between the detection signal and a detection reference signal with the detector control signal. The estimation unit is configured to issue a further input signal to the feedback control unit based on a model of the optic signal detection unit.

20 Claims, 4 Drawing Sheets

(51) Int. Cl.
  *H04B 10/118* (2013.01)
  *H04J 14/00* (2006.01)
(58) Field of Classification Search
  CPC ............ H04B 10/1127; H04B 10/1129; H04B 10/114; H04B 10/1141; H04B 10/1143; H04B 10/1149; H04B 10/116; H04B 10/118
  See application file for complete search history.

OPTIC SIGNAL RECEIVER, OPTIC COMMUNICATION SYSTEM AND OPTIC COMMUNICATION METHOD

CROSS-REFERENCE TO RELATED APPLICATIONS

This patent application is a U.S. National Phase of PCT International Application No. PCT/NL2021/050153, filed Mar. 5, 2021, which claims priority to European Application No. 20161518.4, filed Mar. 6, 2020, which are both expressly incorporated by reference in their entireties, including any references contained therein.

BACKGROUND

Field

The present application pertains to an optic signal receiver, an optic communication system and an optic communication method.

Related Art

Free-space optical communication is an optical communication technology that uses light propagating in free space to wirelessly transmit data for telecommunications or computer networking. "Free space" means air, outer space, vacuum, or something similar. Free-space optical communication implies a transmission of an optic signal in free space between a first and a second optic communication station. The first and the second optic communication station may be provided on a respective carrier such as a satellite or a celestial body, such as the earth or the moon. Hence transmission can for example take place between two satellites, between a satellite and the earth, etc. The optical communication may be uni-directional or bi-directional. The technology is useful where the physical connections are impractical due to high costs or other considerations.

Atmospheric turbulence influences the state of the optical beam used as the signal carrier. In the past 10 years, the effects of atmospheric turbulence have been mitigated using adaptive optics (AO) systems which analyze the incoming distorted wavefront and correct it using a deformable mirror in real time. If the correction is good enough, the signal can be then focused into a quasi-diffraction-limited spot which enables efficient coupling to single-mode fibers.

A further approach to mitigate the disruptive atmospheric effects is to convert the multimode optic signal into reduced-mode optic signals, i.e. few mode or single mode optic signals. This can be achieved with an optic mode splitter, for example a photonic lantern. The presence of a mode-splitter, such as a photonic lantern involves the risk that part of the signal is lost due to the fact that the optical input signal of the mode-splitter comprises optical modes that do not match an available mode of the mode-splitter output.

SUMMARY

It is an object of the present disclosure to provide measures that enable a more efficient use of the optical input signal.

In accordance therewith an optic signal receiver is provided that comprises an optic signal detection unit, an estimation unit and a feedback control unit to provide a detector control signal.

The optic signal detection unit comprises an adaptive optic module, a mode splitting module and a signal detection module. The adaptive optic module is to modify a received optic input signal under control of the detection control signal into a multi-mode optic output signal. The mode splitting module is configured to branch the multi-mode optic output signal off into multiple reduced mode optic signals. The signal detection module is configured to issue a detection signal that comprises a plurality of signal detection sections that are each configured to measure intensity data of a respective one of the reduced mode optic signals and to provide a respective indicator indicative of the measured intensity data.

In some embodiments the intensity data is a single intensity value representative for an intensity of the reduced mode signal provided to the corresponding detection sections. In other embodiments, one, more or all detection sections comprise a plurality of detection subsections, wherein each detection subsection is configured to measure an intensity of a component with a predetermined property in the received reduced mode signal. The predetermined property is for example a polarization state and/or a wavelength range. In that case the intensity data provided by a detection section is a set of intensity values with a respective intensity value for each component in the reduced mode signal detected by a respective detection subsection. Therewith the information content of the detection signal is improved.

The detection signal representing a vector or similar mathematical object having a respective vector component for each of said indicators.

The feedback control unit is configured to minimize a difference between the detection signal and a detection reference signal with the detector control signal.

The estimation unit is configured to issue a further input signal to the feedback control unit based on a model of the optic signal detection unit.

The further input signal from the estimation unit enables the feedback control unit to optimally control the adaptive optic module to modify the received optic input signal into a multi-mode optic output signal that can optimally be converted by the mode splitting module into reduced mode optic signals.

In an embodiment, the further input signal to the feedback control unit is indicative for a relationship between the detection signal and the detector control signal. The indication by the further input signal is for example a differential indication. The differential indication may for example be provided as a matrix, wherein each component of the matrix indicates an expected change of a detection signal component as a result of a change in a parameter of the detector control signal. I.e. when the detector control signal controls m parameters of the adaptive optic module and the detection signal comprises n detection signal components, the matrix comprises n*m matrix elements.

In another embodiment, the further input signal to the feedback control unit is indicative for an estimation of the parameters of the received optic input signal. The indication may for example be estimated with present and historic values of the detection signal and the detector control signal. The indication may moreover be obtained by manipulating or configuring the optic input signal so that additional information is obtained. This may include offering multiple wavelengths, polarization states, etc., as well as actively manipulating the optic input signal with the adaptive optics module.

BRIEF DESCRIPTION OF THE DRAWINGS

These and other aspects are described in more detail with reference to the drawings. Therein.

DETAILED DESCRIPTION OF EMBODIMENTS

Figure 1:
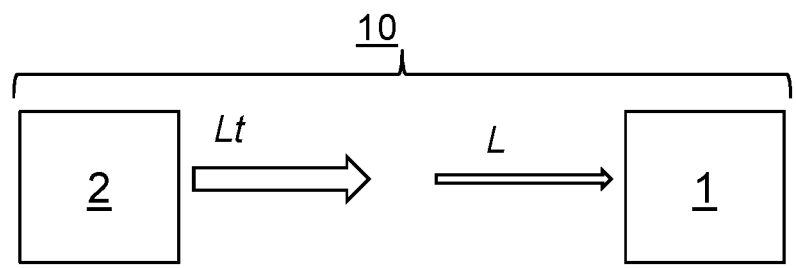
FIG. 1 schematically shows an embodiment of an optic communication system.

FIG. 1 schematically shows an optic communication system 10 that comprising a first optic communication station with an optic signal receiver 1 and a second optic communication station with an optic signal transmitter 2. As schematically shown therein, the optic signal transmitter 2 transmits an optic signal Lt through free space to the optic signal receiver 1. The first and the second optic communication station may be provided on a respective carrier such as a satellite or a celestial body, such as the earth or the moon. Hence transmission can for example take place between two satellites, between a satellite and the earth, etc. The optical communication may be uni-directional or bi-directional. The technology is useful where the physical connections are impractical due to high costs or other considerations. The signal L arriving at the optic signal receiver 1 is a weakened version of the transmitted signal Lt and moreover, the received optic signal L may be distorted due to atmospheric turbulence.

Figure 2:
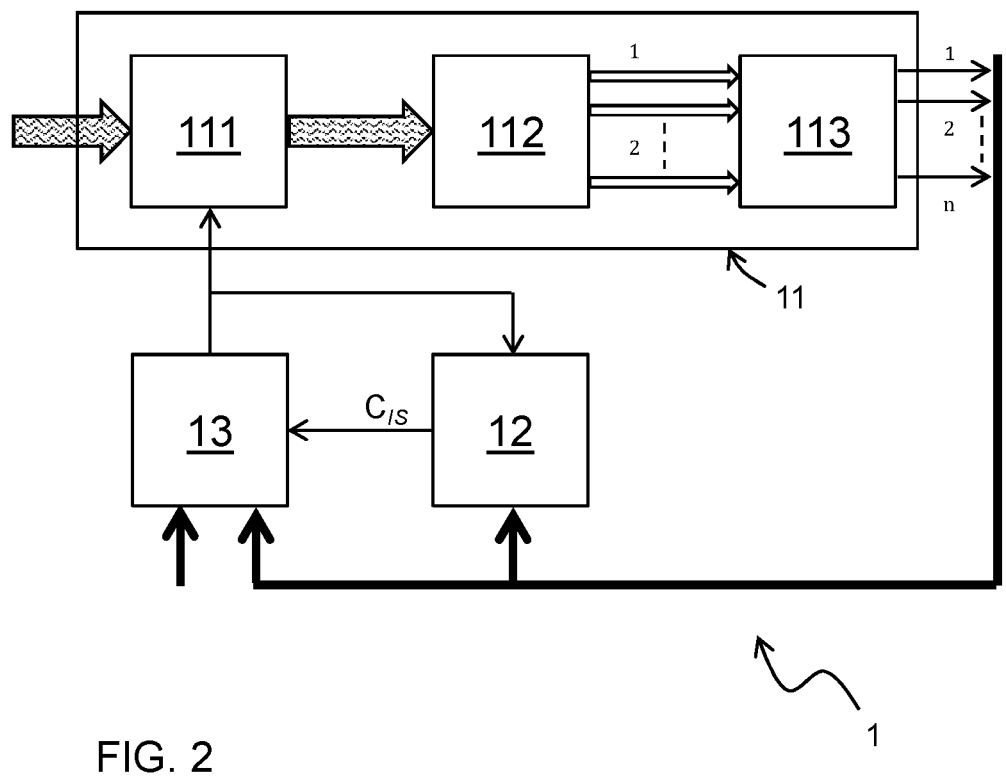
FIG. 2 shows a first embodiment of an optic signal receiver.

FIG. 2 shows an embodiment of an optic signal receiver 1, that comprises an optic signal detection unit 11, an estimation unit 12, and a feedback control unit 13 to provide a detector control signal S.

The optic signal detection unit 11 comprises an adaptive optic module 111, a mode splitting module 112 and a signal detection module 113.

The adaptive optic module 111 is configured to receive an optic input signal L and to modify the received optic input signal L under control of the detector control signal S into a multi-mode optic output signal $\tilde{L}$. The optic input signal L may for example be transmitted to the optic signal receiver via free space, for example by an optic transmitter of a satellite. The adaptive optic module may comprise one or more components to manipulate the state of the received optic input signal L. The manipulation may include a manipulation of direction, polarization, phase, intensity, wavelength. The manipulation may either affect the optic input signal L as a whole (largest group of quanta) or down to single photon manipulation (smallest quantum). The adaptive optic module 111 may for example have a plurality of mirror segments controlled by the detector control signal S.

The mode splitting module 112 is configured to branch the multi-mode optic output signal $\tilde{L}$ off into multiple reduced mode optic signals $L_1, L_2, \ldots, L_n$. The reduced mode signals may for example comprise single-mode and or few mode signals. The mode splitting module 112 can be any device that starts with a relatively large multi-mode fiber MMF which is split into multiple smaller fibers, which can be MMF, few-mode fibers FMF or single-mode fibers SMF. In particular in case of weak input signals it may be preferable to output few mode signals rather than single mode signals. Therewith the measurement accumulation time can be kept modest.

The mode splitting module 112 can for example be provided as a photonic lantern which can be realized in various embodiments. An overview of this technology is provided in Birks, Timothy A., et al. "The photonic lantern." Advances in Optics and Photonics 7.2 (2015): 107-167. Birks also describes technologies for manufacturing a photonic lantern. One of these technologies is waveguide based and has the advantage of resulting in relatively stable products. Another suitable technology is multi-core fiber based. This latter technology is more mature and support more outputs. In an embodiment, The mode splitting module 112 may be manufactured as a directly-written integrated waveguide chip that offers high stability. Alternatively, the stability may be enhanced by controlled thermal and mechanical actuators acting on the mode splitting module 112.

The signal detection module 113 is configured to issue a detection signal I. The signal detection module 113 comprises a plurality of signal detection sections ($113\_1$, $113\_2, \ldots, 113\_n$, see FIG. 4). Each of the signal detection sections $113\_1, 113\_2, \ldots, 113\_n$, is configured to measure intensity data of a respective one of the reduced mode optic signals and to provide a respective indicator $I_1, I_2, \ldots, I_n$ indicative of the measured intensity data as a component of the detection signal I. It is noted that the wording "intensity" is used in a generic sense. In case of sparse optical signals the intensity may indicate a likeliness function, i.e. an indication of likeliness that a photon having associated mode(s) and time(−interval) is measured. Each signal detection section may for example comprise a photon counter, or a plurality of photon counters to increase the dynamic range.

Examples of photon counters are a Geiger counter, a single-photon avalanche diode, for example provided as a photomultiplier, superconducting nanowire single-photon detector, transition edge sensor, or scintillation counter. Charge-coupled devices can also sometimes be used. Each of the signal detection sections may moreover be configured to detect a plurality of intensity levels dependent on a light property. For example each intensity level of said plurality is indicative for a respective wavelength range and/or polarization state, therewith effectively increasing information conveyed with the signal I.

Figure 4:
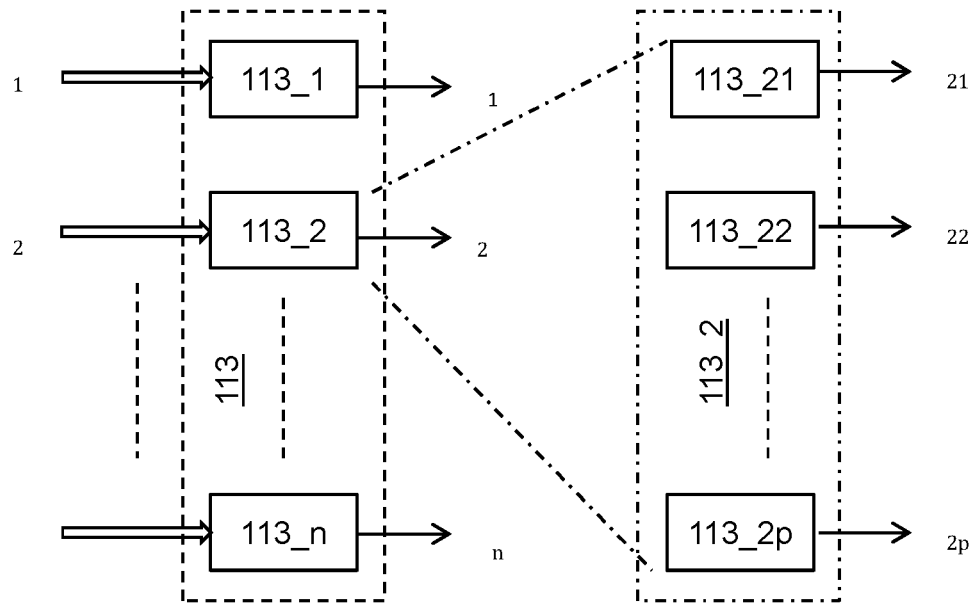
FIG. 4 schematically shows an example of a signal detection module.

In the exemplary embodiment of FIG. 4, it is shown that the signal detection section $113\_2$ has a plurality of signal detection subsections $113\_21, 113\_22, \ldots, 113\_2p$. Each detection subsection $113\_21, 113\_22, \ldots, 113\_2p$ is configured to measure an intensity $I_{21}, I_{22}, \ldots, I_{2p}$ of a component with a predetermined property in the received reduced mode signal L2. The signal detection subsections $113\_21, 113\_22, \ldots, 113\_2p$. are for example each sensitive for light with a predetermined polarization state and/or a wavelength range in the received reduced mode signal $L_2$. Accordingly, the intensity data $I_2$ provided by the detection section $113\_2$ is a set of intensity values $I_{21}, I_{22}, \ldots, I_{2p}$. Each intensity value corresponds to a component in the reduced mode signal $L_2$ detected by a respective detection subsection of the detection section $113\_2$. Therewith the information content of the detection signal I is improved. In some embodiments the reduced mode signal $L_2$ is split into multiple reduced mode signal components corresponding to the predetermined properties. In that case it is not necessary that the detection subsection has a specific sensitivity for that light with that property. In other embodiments the reduced mode signal $L_2$ is split into multiple reduced mode signal components without differentiation according to their properties, for example by a set of semi-reflecting mirrors. In that case the signal detection subsections are provided with signal detection components having a specific sensitivity for each wavelength range and/or polarization state for example. Whereas in this illustrative example only the and their intensity is measured by a general type of detection section 113_2. is shown with a plurality of detection subsections, it will be understood that other detection sections or even all detection sections may have a plurality of detections subsections for this purpose.

The feedback control unit 13 is configured to minimize a difference between the detection signal I and a detection reference signal $I_d$ with the detector control signal S.

The estimation unit 12 is configured to issue a further input signal $C_{IS}$ to the feedback control unit 13 based on a model of the optic signal detection unit 11. The model used for the optic signal detection unit may be a static model, but may alternatively be adapted in response to observations. Moreover the operation of the optic signal detection unit, not only of the adaptive optic module 111, but also the mode splitting module 112 can be controlled for example by thermal or mechanical manipulation of the mode splitting module 112. Dependent on the application a lower or higher closed loop control frequency may be desired. For large distance communication, where atmospheric turbulence plays a significant role, a relatively high closed loop control frequency, e.g. in the order of 10-100 Hz, possibly up to 1 kHz may be selected. For other applications, e.g. Lidar applications the effects of atmospheric turbulences are less significant, and a lower closed loop control frequency may be applied.

According to one approach, the operation of the estimation unit 12 is based on a sensitivity analysis. Therewith the estimation unit 12 determines a relationship between changes in the control signal S and the effect of these changes on the detection signal L This relationship can be expressed as a matrix C:

$$C = \begin{pmatrix} \begin{bmatrix} \frac{\partial I1}{\partial S1} & \cdots & \frac{\partial I1}{\partial Sk} \\ \vdots & \ddots & \vdots \\ \frac{\partial In}{\partial S1} & \cdots & \frac{\partial In}{\partial Sk} \end{bmatrix} \end{pmatrix},$$

specifying the observed relationship between variations in the detection signal components (I1, ..., In) and the components (S1, ..., Sk) of the control signal S.

Therewith the feedback control unit 13 is enabled to render the control signal S as follows:

$S = K \cdot C^{-1} \cdot (I_d - I)$, wherein K is multiplication factor. The multiplication factor may be associated with a driver stage that actuates the mirror segments. The feedback control unit may include for example proportional, integrating and differentiating components to dependent a required response time and accuracy.

According to another approach, the operation of the estimation unit 12 is based on a wavefront reconstruction.

In this case the multi-mode optic output signal L at the input of the mode splitting module 112 is estimated. Therewith it is also possible to estimate the received input signal L from the estimation of the multi-mode optic output signal $\tilde{L}$ using a transformation that inverts the operation of the adaptive optic module 111.

Both estimation approaches presented may rely on historic knowledge on S and I for the estimation, in addition to separated measurement of specific light properties such as polarization and wavelength differences in the signal detector module 113.

Figure 3:
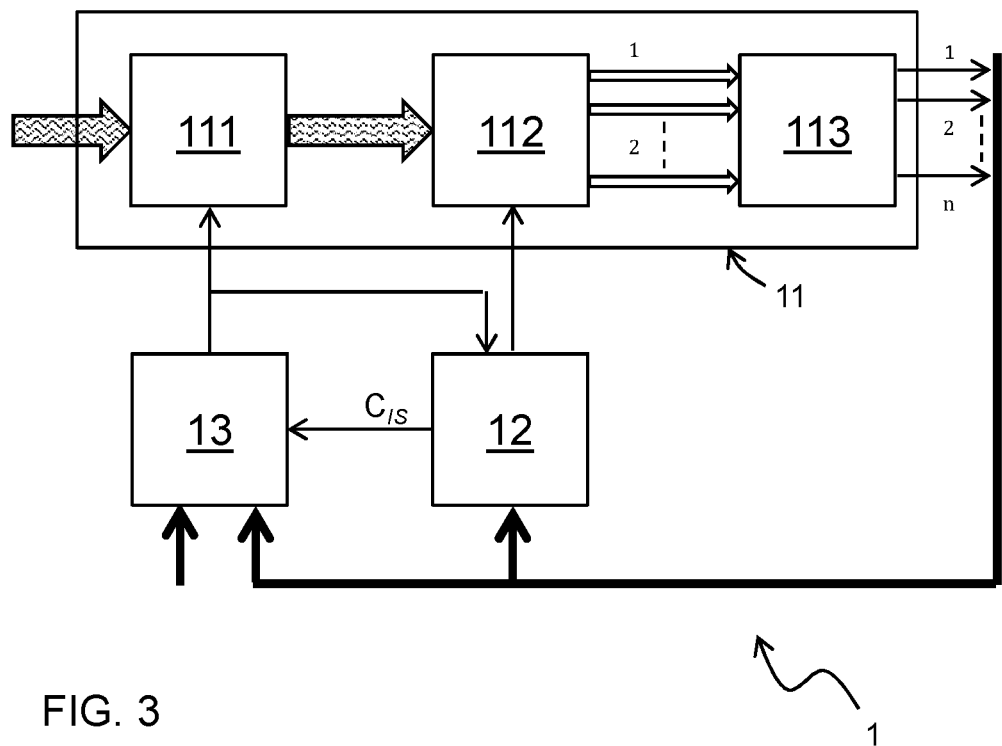
FIG. 3 shows a second embodiment of an optic signal receiver.

As shown schematically in FIG. 3 the estimation unit 12 may further be configured to control the mode splitting module 112 with a control signal A. With the control signal A, the estimation unit 12 may for example control a temperature profile inside the mode splitting module 112, so as to achieve or maintain specific operation properties. The estimation unit 12 may also estimate model parameter data M specifying how the mode splitting module 112 controlled by the signal A converts the multi-mode optic output signal $\tilde{L}$ into a detection signal I, and reversely, how it can compute an estimation $\hat{L}$ from the multi-mode optic output signal $\tilde{L}$ or from the received input signal L. To a certain extent the estimation unit 12 may use the control signal A to have available an additional way to manipulate the received input signal L in combination with the manipulation by the adaptive optic module 111.

The estimation unit 12 can for example use a predetermined model of the mode splitting module 112 and/or it can obtain model parameter data learned from observing the response of the mode splitting module 112 to test signals.

It may in practice be the case that an observed detection signal I does not uniquely correspond to a particular multi-mode optic output signal L or optic input signal L. For such cases it may be contemplated to combine both approaches referred to above. One way of combining is as follows. First the wavefront reconstruction approach is used to determine which realizations of the optic input signal could have resulted in a particular detection signal I. For example a detection signal I could potentially correspond to realizations $L_1, \ldots, L_m$ of the optic input signal. Second, for each of the potentially corresponding realizations $L_1, \ldots, L_m$ a sensitivity analysis is performed to determine the derivatives $(\partial I/\partial S)_{I=I1}, \ldots, (\partial I/\partial S)_{I=In}$ evaluated at operating points $L_0, \ldots, L_m$. Typically the derivatives will be clearly different from each other, in that each derivative will have a unique 'signature' determined by its n×k derivative components.

In typical applications, the optic signal L to be received will be modulated, it may for example be provided as a pulsed signal. The signal pulses can be easily discriminated from background noise in that they correspond to a detection of a significant number of photons (more than a threshold number) within a time interval. These photons can therewith be classified as signal photons having a different source (and therefore a different state) than the "other" e.g. noise photons. By identifying which state these photons have (and how this state changes over time, due to atmospheric turbulence among other things), it can be ensured that the signal-to-noise ratio is improved. This is achieved by configuring the optic signal receiver in accordance with the state of the signal, so that the signal is captured in a desired choice of modes.

Figure 5:
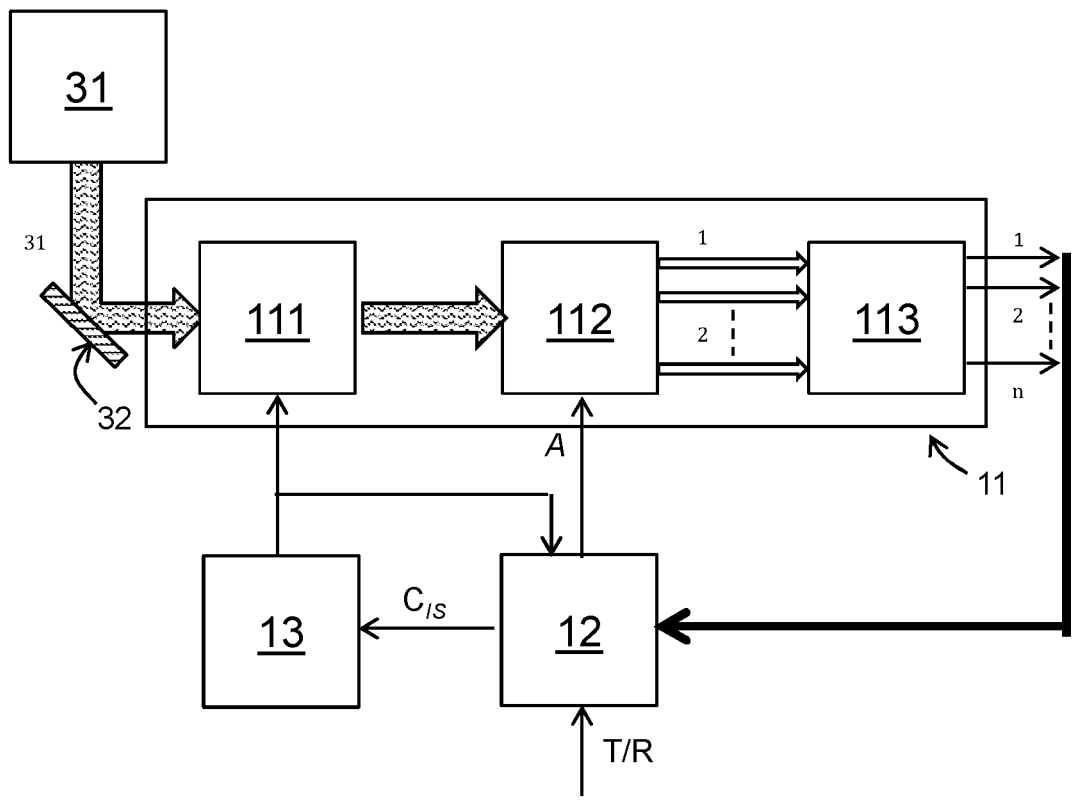
FIG. 5, 5A show an arrangement including an embodiment of the optic signal receiver.
Figure 5A:
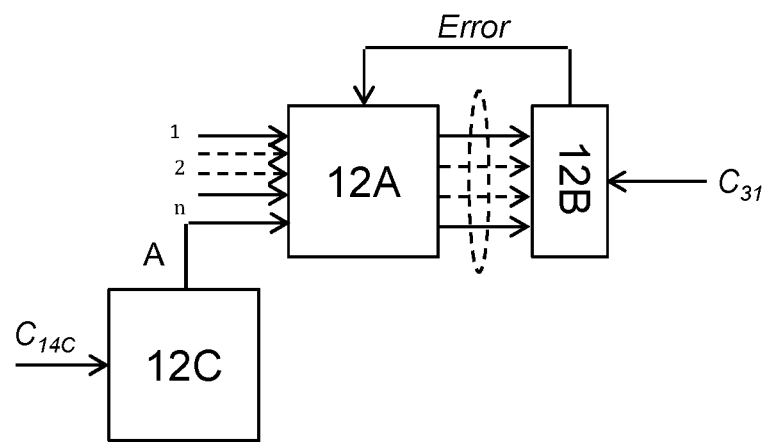

FIG. 5, 5A show an arrangement wherein the estimation unit 12 is trained. The arrangement comprises a known radiation source 31 that generates a predetermined optical beam $\tilde{L_{31}}$. In the example shown, the optical beam $\tilde{L_{31}}$ is directed by a mirror 32 to the mode splitting module 112. During the training procedure, the predetermined optical beam is manipulated by controlling the adaptive optic module 111 with control signal S according to training input data and observing the detection signals I. Optionally also the mode splitting module 112 may be manipulated with control signal A according the training input data.

The estimation unit 12 comprises a model identification processor 12A that is to estimate beam parameters $\hat{L}$ from the intensity data I provided at the output of signal detection module 113. The model identification processor may for example be a deep learning network as described in "Learning to see through multimode fibers" Borhani et al, 2018. However, any other identification process may be provided for this purpose, such as neural network processes including (multilayer) perceptron, a Hopfield network, a Boltzmann machine, a radial basis function network and a support vector machine. The model identification processor 12A can be trained by back propagation for example, therewith using the input provided by the error computation section 12B.

The parameters with which the beam $\hat{L}$ is characterized may be selected from for example spatial phase and intensity information related to the beam $\hat{L}$ or Zernike modes that more specifically provide macro information about the wavefront of the beam $\hat{L}$. Another selection of a parameter set is possible as well, as long as their setting can be properly controlled by the control signal to the adaptive optical module and they can be determined with sufficient accuracy.

The estimation unit 12 can be controllably configured into one of a training mode (T) and a normal operational mode (R). In a first approach the training mode activates the error computation section 12B that compares the estimated beam parameters $\hat{L}$ with the parameters of the predetermined beam $L_{31}$ and generates an Error-signal with which the neural network processor 12A is trained. While the estimation unit 12 is in its training mode, it generates a series of training examples by controlling the feedback control unit 13 with the control signal $C_{IS}$ and optionally by controlling the mode splitting module 112 with control signal A.

The training mode can be ended if the Error-signal indicates that the beam parameters are estimated with sufficient accuracy. In an embodiment the model identification processor 12A may be pre-trained on the basis of a generic model of the adaptive optics module 111 and the mode splitting module 112, so that only a modest number of examples is needed to achieve a sufficient accuracy. In the normal operational mode of the estimation unit 12, the estimated beam parameters $\hat{L}$ as computed by the model identification processor 12A may be provided as input to the feedback control unit 13.

In a second approach, the training mode activates the error computation section 12B that compares the estimated derivative $\widehat{\partial I/\partial S}$ with a derivative $\partial I/\partial S$ that is actually observed when the estimation unit 12 causes the feedback control unit 13 with the control signal $C_{IS}$ to variate its settings around the currently selected set-point. The training procedure may continue until the Error-signal indicates that the prediction of the derivative can be achieved with a sufficient accuracy. In an embodiment the model identification processor 12A may be pre-trained on the basis of a generic model of the optic signal detection unit 11, so that only a modest number of examples is needed to achieve a sufficient accuracy.

During its normal operation the model identification processor 12A is to estimate the beam parameters $\hat{L}$ or the sensitivity $\partial I/\partial S$, for respectively the first and second approach, as a function of the currently measured intensity vector I ($I_1$, $I_2$, . . . , $I_n$) and to communicate this prediction with the signal $C_{IS}$ to the feedback control unit 13. Therewith the feedback control unit 13 is to generate the control signal S, with which it is configured to adapt the setting of the adaptive optic module 111 so as to minimize a difference between the observed detection signal I and the detection reference signal $I_d$.

Figure 6:
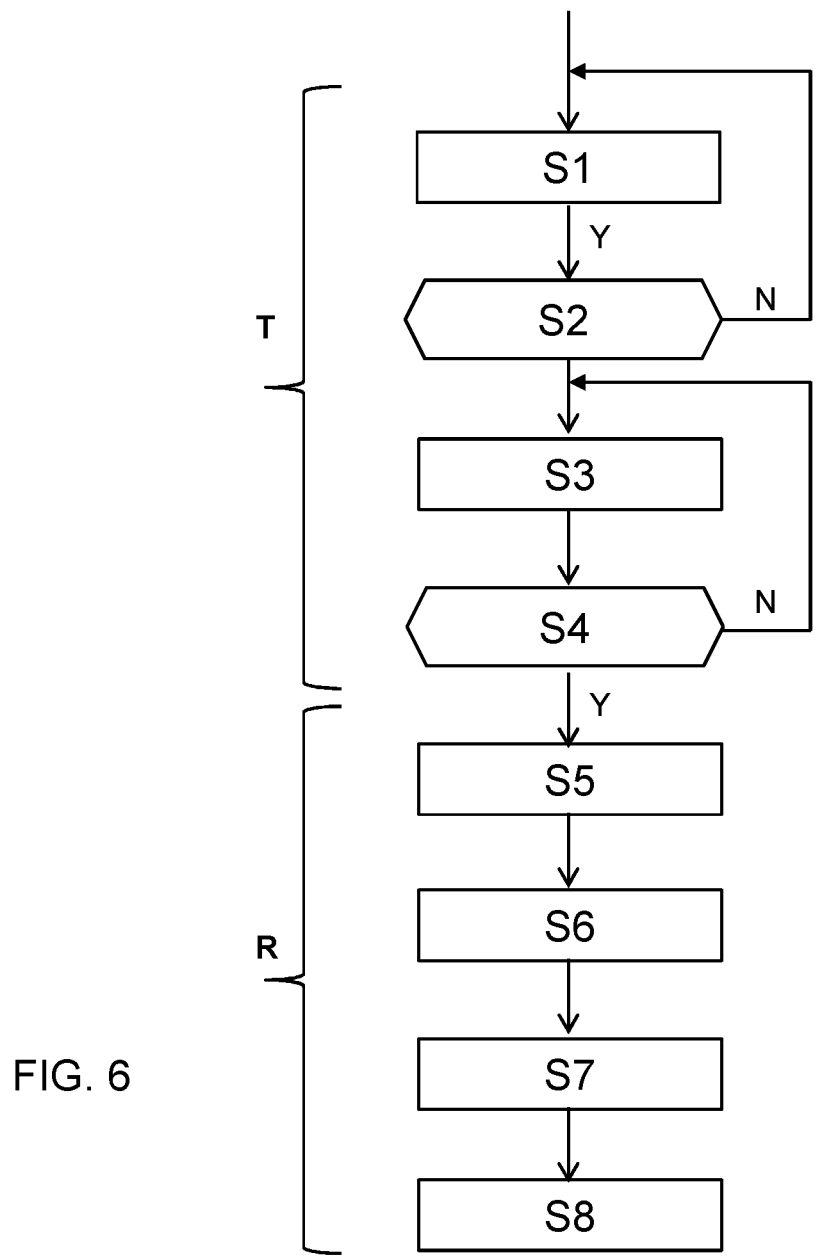
FIG. 6 schematically shows an embodiment of a method of detecting an optic signal.

FIG. 6 schematically shows an embodiment of a method of detecting an optic signal.

The exemplary method comprises a first training step S1 wherein a model identification processor is trained to predict the effect of detector control signal (S) variations by adaptively modifying the optic input signal (L) in accordance with a series of detector control test signal instances and providing respective pairs of each of said detector control test signal instance and the resulting detection signal instances as examples to the model identification procedure, as described for example with reference to FIG. 5, 5A. The training step S1 may be repeated until it is determined in a verification step S2 that the model identification processor has reached sufficient accuracy.

The exemplary method comprises a second training step S3 wherein a further model identification processor is trained to estimate the optic input signal L or the multimode optic output signal L on the basis of the detection signal I. The second training step S3 may be performed in the manner described with reference to FIG. 5, 5A. The training step S3 may be repeated until it is determined in a verification step S4 that the model identification processor operates with sufficient accuracy.

Optionally, training steps S1 and S3 may be performed simultaneously.

Subsequently in step S5, an optic input signal $\hat{L}$ is received, and under control of an adaptive optics control signal S the optic input signal L is adaptively modified into a multi-mode optic output signal $\hat{L}$, for example by the adaptive optic module 111 in FIG. 2, 3.

In step S6, the multi-mode optic output signal $\hat{L}$ is branched off into multiple reduced mode optic signals $L_1$, $L_2$, . . . , $L_n$. for example by the mode splitting module 112 in FIG. 2, 3.

In step S7 intensity data of each reduced mode optic signal is measured, and a detection signal I with a respective indicator $I_1$, $I_2$, . . . , $I_n$ is provided for each measured intensity data. Therewith for example the signal detection module 113 of FIG. 4 is used. As shown in FIG. 4, intensity data for a reduced mode optic signal may comprise a single intensity value for that component or may a set of intensity values $I_{21}$, $I_{22}$, . . . , $I_{2p}$, wherein ach intensity value corresponds to a component (e.g. in a wavelength range and/or with a polarization state) in the reduced mode signal $L_2$ detected by a respective detection subsection of the detection section 113_2. s Therewith an intensity signal I conveying significantly more information is obtained. For example if each signal detection section 113_1, 113_2, . . . , 113_n, has p signal detection subsections, the detection signal I has n*p detection signal components.

In step S8 the detector control signal S is provided to minimize a difference between the detection signal I and a detection reference signal $I_d$. The computation of the detector control signal S is based on an optic signal detection model for a relationship between said detection signal and said input optic input signal or a relationship between said detection signal and said multi-mode optic output signal. In some embodiments the model specifies how the detector control signal S affects the detection signal I. In other embodiments the model predicts the optic input signal or the multi-mode optic output signal on the basis of the detection signal I. In still further embodiments the model is provided to specify how the detector control signal S affects the detection signal I and further predicts the optic input signal or the multi-mode optic output signal on the basis of the detection signal.

The invention claimed is:

1. An optic signal receiver comprising an optic signal detection unit, an estimation unit, and a feedback control unit to provide a detector control signal to control operation of the optic signal detection unit, wherein:
the optic signal detection unit comprises an input module, a mode splitting module and a signal detection module, wherein the input module is configured to modify a received optic input signal into a multi-mode optic output signal, wherein the mode splitting module is configured to branch the multi-mode optic output signal off into multiple reduced mode optic signals, wherein the signal detection module is configured to issue a detection signal, and wherein the signal detection module comprises a plurality of signal detection sections that are each configured to measure an intensity data of a respective one of the reduced mode optic signals and to provide a respective indicator indicative of the measured intensity data as a component of the detection signal;
the feedback control unit being is configured to minimize a difference between the detection signal and a detection reference signal with the detector control signal; and
the estimation unit is configured to issue a further input signal to the feedback control unit based on a model of the optic signal detection unit, and the input module is an adaptive optic module that is configured to modify the received optic input signal under control of the detector control signal.

2. The optic signal receiver according to claim 1, wherein the adaptive optic module is controlled to provide for a desired distribution among the different reduced mode outputs from the mode splitting module.

3. The optic signal receiver according to claim 1, wherein a signal detection section comprises one or more photon detection components.

4. The optic signal receiver according to claim 1, wherein the further input signal to the feedback control unit is indicative for an estimation of the parameters of the received optic input signal.

5. The optic signal receiver according to claim 1, wherein the further input signal to the feedback control unit is indicative for a relationship between the detection signal and the detector control signal.

6. The optic signal receiver according to claim 1, wherein the estimation unit further is configured to provide a control signal to control the mode splitting module.

7. The optic signal receiver according to claim 6, wherein the estimation unit provides the control signal to stabilize operation of the mode splitting unit using mechanical and/or thermal manipulation.

8. The optic signal receiver according to claim 7, wherein the estimation unit is further configured to estimate model parameter data specifying how the mode splitting module controlled by the control signal converts the multi-mode optic output signal into a detection signal.

9. An optic communication system, comprising a first optic communication station with an optic signal receiver according to claim 1 and a second optic communication station with an optic signal transmitter.

10. The optic signal receiver according to claim 4, wherein the estimation unit further is configured to provide a control signal to control the mode splitting module.

11. The optic signal receiver according to claim 5, wherein the estimation unit further is configured to provide a control signal to control the mode splitting module.

12. A method of detecting an optic signal comprising:
modifying an optic input signal into a multi-mode optic output signal,
branching the multi-mode optic output signal into multiple reduced mode optic signals;
measuring intensity data of each reduced mode optic signal and providing a detection signal with a respective indicator for the measured intensity data of each reduced mode optic signal;
providing a detector control signal to minimize a difference between the detection signal and a detection reference signal, wherein the providing a detector control signal is based on an optic signal detection model for a relationship between the detection signal and the input optic input signal or a relationship between the detection signal and the multi-mode optic output signal, and wherein the optic input signal is modified into a multi-mode optic output signal in an adaptive manner in accordance with the detector control signal.

13. The method according to claim 12, wherein the model specifies how the detector control signal affects the detection signal.

14. The method according to claim 12, comprising a training step wherein a model is identified to predict an effect of detector control signal variations by:
adaptively modifying the optic input signal in accordance with a series of detector control test signal instances, and
providing respective pairs of each of the detector control test signal instance and resulting detection signal instances as examples to a model identification.

15. The method according to claim 12, wherein the model predicts the optic input signal or the multi-mode optic output signal on the basis of the detection signal and/or the detector control signal.

16. The method according to claim 15, further comprising controlling the branching multi-mode optic output signal into multiple reduced mode optic signals.

17. The method according to claim 10, wherein the model predicts the optic input signal or the multi-mode optic output signal on the basis of the detection signal and/or the detector control signal, the method further comprising:
determining potentially valid realizations of the optic input signal or of the multi-mode optic output signal that correspond to the detection signal;
computing a signature by determining how the detection signal is affected by variations in the detection control signal; and
selecting from the potentially valid realizations one realization for which the known signature best matches the computed signature.

18. The method according to claim 14, wherein the model predicts the optic input signal or the multi-mode optic output signal on a basis of the detection signal and/or the detector control signal, the method further comprising:
determining potentially valid realizations of the optic input signal or of the multi-mode optic output signal that correspond to the detection signal;
computing a signature by determining how the detection signal is affected by variations in the detection control signal;
selecting from the potentially valid realizations the one for which the known signature best matches the computed signature.

19. The method according to claim 17, further comprising controlling the branching the multi-mode optic output signal into multiple reduced mode optic signals.

20. The method according to claim 18, further comprising controlling the branching the multi-mode optic output signal into multiple reduced mode optic signals.

\* \* \* \* \*